US005648841A

United States Patent [19]

Yasuda et al.

[11] Patent Number: 5,648,841

[45] **Date of Patent: *Jul. 15, 1997**

[54] APPARATUS FOR FORMING FIXED IMAGES HAVING ENCAPSULATED TONER

[75] Inventors: Shin-ichiro Yasuda, Osaka; Kuniyasu Kawabe; Mitsuhiro Sasaki, both of Wakayama, all of Japan

[73] Assignee: Kao Corporation, Tokyo, Japan

[ * ] Notice: The term of this patent shall not extend beyond the expiration date of Pat. No. 5,463,454.

[21] Appl. No.: 339,692

[22] Filed: Nov. 14, 1994

Related U.S. Application Data

[62] Division of Ser. No. 111,739, Aug. 25, 1993, Pat. No. 5,463,454, which is a continuation of Ser. No. 890,268, May 29, 1992, abandoned.

[30] Foreign Application Priority Data

| | | | |
|---|---|---|---|
| May 30, 1991 | [JP] | Japan | 3-155300 |
| May 30, 1991 | [JP] | Japan | 3-155301 |

[51] Int. Cl.$^6$ .................. G03B 22/00

[52] U.S. Cl. .................. 399/134; 219/216

[58] Field of Search .................. 355/282, 285, 355/289, 290; 219/216, 469; 430/109

[56] References Cited

U.S. PATENT DOCUMENTS

| | | | |
|---|---|---|---|
| 3,810,735 | 5/1974 | Moser | 219/216 X |
| 3,997,790 | 12/1976 | Suzuki et al. | 250/319 |
| 4,542,980 | 9/1985 | Tajima | 355/286 |
| 4,795,689 | 1/1989 | Matsubara et al. | 430/99 |
| 4,990,424 | 2/1991 | Van Dusen et al. | 430/109 X |
| 5,049,469 | 9/1991 | Pierce et al. | 430/109 |
| 5,110,977 | 5/1992 | Wilson et al. | 430/109 X |
| 5,213,934 | 5/1993 | Sacripante et al. | 430/109 |
| 5,225,308 | 7/1993 | Sasaki et al. | 430/109 X |
| 5,428,435 | 6/1995 | Yasuda et al. | 355/286 X |
| 5,463,454 | 10/1995 | Yasuda et al. | 355/290 |

FOREIGN PATENT DOCUMENTS

| | | |
|---|---|---|
| 0193914 | 9/1986 | European Pat. Off. . |
| 0357086 | 3/1990 | European Pat. Off. . |
| 0453857 | 10/1991 | European Pat. Off. . |
| 59-002029 | 1/1984 | Japan . |
| 62-242978 | 10/1987 | Japan . |
| 63-108357 | 5/1988 | Japan . |
| 63-201677 | 8/1988 | Japan . |
| 1-267660 | 1/1990 | Japan . |
| 2-032368 | 2/1990 | Japan . |
| 2-162355 | 6/1990 | Japan . |
| 2-162356 | 6/1990 | Japan . |
| 2-190870 | 7/1990 | Japan . |
| 3-031858 | 2/1991 | Japan . |

*Primary Examiner*—Robert Beatty
*Attorney, Agent, or Firm*—Birch, Stewart, Kolasch & Birch, LLP

[57] ABSTRACT

A method of forming fixed images including charging a photoconductor; exposing the photoconductor to light; developing an electrostatic latent image so that a toner is applied to the electrostatic latent image formed on the photoconductor to form a visible image; transferring the formed visible image to a recording medium; and fixing the transferred visible image onto the recording medium, such that the toner is a thermally dissociating encapsulated toner and the fixing process is carried out at a temperature of not less than 40° C. and not more than 120° C.

2 Claims, 7 Drawing Sheets

APPARATUS FOR FORMING FIXED IMAGES HAVING ENCAPSULATED TONER

This application is a divisional of application Ser. No. 08/111,739 filed on Aug. 25, 1993, now U.S. Pat. No. 5,463,454, which was a continuation of Ser. No. 07/890,268, filed on May 29, 1992, now abandoned, the entire contents of which are hereby incorporated by reference.

FIELD OF THE INVENTION

The present invention relates to a method of forming fixed images used for plain paper copying machines, laser printers, plain paper facsimiles, etc. More particularly, it relates to a method of forming images in which low temperature fixing is carried out using a thermally dissociating encapsulated toner.

BACKGROUND OF THE INVENTION

Conventionally, when images are formed with copying machines, laser beam printers, etc., the Carlson Method has been generally used (U.S. Pat. Nos. 2,221,776, 2,297,691 and 2,357,809, "Electrophotography," p22–p41, R. M. Shaffert, 1965, The Focal Press).

FIG. 2 shows a schematic view of an apparatus for a conventional method of forming fixed images. In the conventional method, after the electrostatic latent image formed on a photoconductor by optical means is developed in a developing process, it is transferred to a recording medium such as recording paper in a transfer process and then fixed into the final image generally with heat and pressure in a fixing process. As the photoconductor is repeatedly used, a cleaning device is provided for cleaning the residual toner after the transfer process with its rotation.

In the conventional method of forming fixed images, however, through the processes from the formation of the electrostatic latent image up to its fixing onto the recording medium, the temperature of the heating element of the fixing device has to remain at a very high level (usually around 200° C.) and further a relatively high pressure is required (usually between 2.0 and 6.0 kg/cm). On the other hand, since both the photoconductor and the developing device have to be maintained at around room temperature, a considerable distance has to be maintained between the fixing device and the developing device, which necessitates making the machine larger. In addition, it is necessary to force the removal of the generated heat from the system, but the noise produced by the forced radiation device is not negligible.

Further, in the conventional method of forming fixed images, since the fixing section works independently and at such a high temperature of around 200° C., as mentioned above, expensive heat-resistant materials such as heat-resistant resins, heat-resistant rubbers, etc. have to be provided around the fixing device.

When the fixing is carried out at a high temperature, it is subject to problems such as curling and jamming of the paper, etc. In addition, it is pointed out that a fixing failure may take place due to the heat absorbed by the paper, depending upon its thickness. Further, if the fixing requires a high temperature, it takes more time to reach the set temperature so that a quick printing becomes impossible. In such a case, therefore, this method is unsuitable for devices such as a facsimile which requires quick printings.

As for solving these problems, a device for carrying out low temperature fixing using a cold pressing method (Japanese Patent Laid-Open No. 159174/1984) is known. In this reference, however, although the fixing temperature is low, the nip pressure has to be elevated normally to not less than 4 kg/cm in this method, making the machine heavier. Moreover, it poses problems in the gloss of the images, deformation of the paper copy sheets and an insufficient fixing strength. As for a fixing device for fixing images at such a low nip pressure of less than 4 kg/cm, a heat roller method is known, for example, but it has been pointed out that the fixing temperature needs to be maintained at not less than 120° C.

Under the circumstances, the development of a fixing device that can fix images at a low temperature and at a low nip pressure is highly desired, but it has not yet been developed. Further, as regards toners to be indispensably used for the image formation, since they have been confined to those made from a thermoplastic resin dispersed with additives such as coloring agents, charge control agents, releasing agents, etc., and pulverized, there have been limitations on the molecular weight, the softening point of the thermoplastic resin for use in the toner from the aspect of storage stability, thereby posing limitations on the further pursuit of low temperature fixing.

From these standpoints, the development of a novel method of forming fixed images as well as a matching toner thereto is in demand.

SUMMARY OF THE INVENTION

An object of the present invention is to provide a novel method of forming fixed images, wherein an extremely low fixing temperature as well as a low nip pressure is utilized so that the radiator can be made much smaller and the noise substantially reduced, thus providing advantageous results such as the reduction of curling and jamming of the paper sheets and quick printing.

Therefore, in view of solving the above-mentioned problems, the present inventors have investigated a toner shell material which is fragile to heat at a low temperature. As a result, they have found that a thermally dissociating encapsulated toner produced by interfacial polymerization melts at a temperature of not more than 120° C., and they have further investigated the image formation method using this encapsulated toner and have thus developed the present invention.

More particularly, the method of forming fixed images of the present invention comprises charging a photoconductor; exposing the photoconductor to light; developing an electrostatic latent image whereby a toner is applied to the electrostatic latent image formed on the photoconductor to form a visible image; transferring the formed visible image to the recording medium; and fixing the transferred visible image onto the recording medium, wherein the toner is a thermally dissociating encapsulated toner whereby the fixing process is carried out at a temperature of not less than 40° C. and not more than 120° C.

It is also possible to maintain the nip pressure in the fixing process under 4 kg/cm. As the heat source in the fixing device, a heating body utilizing an endless film or a heat roller is used. Further, radiation around the fixing device is carried out by a honeycomb-type cooling apparatus.

Since the fixing temperature can be set extremely low using the thermally dissociating encapsulated toner according to the present invention, the necessity for forced radiation is reduced so that the radiator device can be made extremely small and the noise substantially reduced. Moreover, as the fixing temperature is very low, problems such as the curling and the jamming of the paper sheets are less likely to occur. The low fixing temperature reduces the time before the set temperature is reached, making quick printing possible.

BRIEF DESCRIPTION OF THE DRAWINGS

The present invention will become more fully understood from the detailed description given hereinbelow and the accompanying drawings which are given by way of illustration only, and thus, are not limitative of the present invention, and wherein.

DETAILED DESCRIPTION OF THE INVENTION

Figure 1:
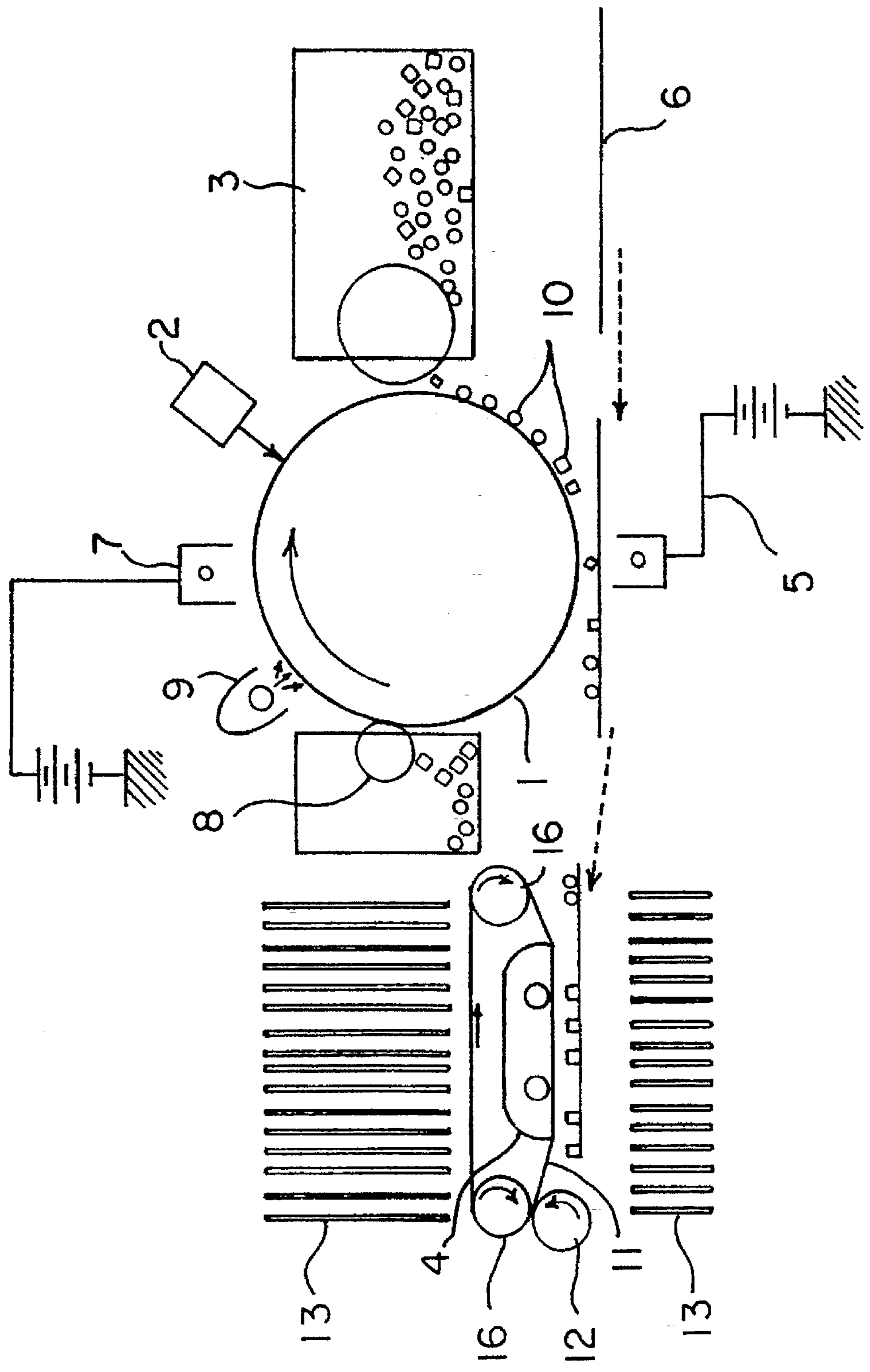
FIG. 1 is a schematic view of an apparatus used in the method of forming fixed images as defined by the present invention.

The reference numerals in FIGS. 1 through 8 denote the following elements:

Element 1 is a photoconductor, element 1*a* a photoconductive layer, element 1*b* a conductive supporter, element 2 an exposure device, element 3 a developer device, element 3*a* a rotating sleeve, element 4 a heater, element 5 a transfer device, element 6 a recording medium (a recording paper), element 7 a charger, element 8 a cleaner device, element 8*a* a toner collecting box, element 9 a charge eraser, element 10 a toner, element 11 an endless film, element 12 a fixing roller, element 13 a radiator device, element 14 a heat roller, element 15 a conveyor belt, and element 16 a holding roller.

The toner used in the present invention is a thermally dissociating encapsulated toner. The encapsulated toner according to the present invention comprises a heat-fusible core containing at least a coloring agent and a shell formed thereon so as to cover the surface of the core material. In the present invention, the thermally dissociating encapsulated toner means a toner which comprises a shell whose structure is fragile to heat, and a core material which can be fixed at a low temperature by pressure. More particularly, the shell structure changes with heat, and at the point where pressure is applied, the core material is discharged to effect the fixing of the toner. Depending on the raw materials and production method, a large variety of encapsulated toners are conceivable, and as long as they are within the range of the required thermal properties, there are no limitations on what production process or materials are used. The toner in the present invention is a thermally dissociating encapsulated toner, and any toner whose fixing temperature is maintained in the range of 40° to 120° C. to the recording medium such as a recording paper can be properly chosen.

As to the method for producing the encapsulated toners, the following can be mentioned.

(1) Spray-drying method

After the core material is dispersed in a non-aqueous solution of polymer or polymer-emulsion, the dispersed liquid is spray-dried.

(2) Phase separation method (coacervation method)

In a solution of ionic polymer colloids and the core material, phase separation is conducted around the core material. In other words, a simple emulsion is first prepared, which in turn is converted to a complex emulsion, in which the core materials are micro-encapsulated.

(3) interfacial polymerization method

A core material solution or dispersion is dispersed in a water in oil or oil in water type emulsion system, while at the same time shell material monomers (A) are collected around the surfaces, where in the next method, monomers (A) and monomers (B) react.

(4) Other methods include an in-situ polymerization method, a submerged cure coating method, an air suspension coating method, an electrostatic coalescing method, a vacuum vapor deposition coating method, etc.

The particularly preferred toners include those produced by the interfacial polymerization method and the spray-drying method. While the spray-drying method has the merits of an easy function separation for the core material and shell material and a large choice of shell materials, the interfacial polymerization method not only has the merit of an easy function separation for the core material and shell material but also is capable of producing a uniform toner in an aqueous state. Moreover, substances of low softening points can be used for the core material in the interfacial polymerization method, making it particularly suitable from the aspect of fixing ability. Accordingly, in the present invention, the thermally dissociating encapsulated toner produced by the interfacial polymerization method among others is particularly preferred.

For shell materials, styrene resins (Japanese Patent Laid-Open No.205162/1983), polyamide resins (Japanese Patent Laid-Open No.66948/1983), epoxy resins (Japanese Patent Laid-Open No.148066/1984), polyurethane resins (Japanese Patent Laid-Open No.179860/1982), polyurea resins (Japanese Patent Laid-Open No.150262/1987) and many others have been proposed. And as substances fixible under heat and pressure contained in the core material, thermoplastic resins such as polyester resins, polyamide resins, polyester-polyamide resins, and vinyl resins having glass transition points (Tg) between 10° C. and 50° C. can be used.

As compared to the thermal properties of the core material, the structure and the thermal properties of the shell material concern themselves remarkably with the fixing ability of the entire toner. Since a particular polyurethane resin among the above-mentioned resins for the shell materials is thermally dissociating, having excellent storage stability and fixing ability at a low temperature, it is an extremely favorable material for the method of forming fixed images of the present invention. As principal components of such a shell material, resins obtainable from the reaction between an isocyanate compound and/or isothiocyanate compound and compounds containing a phenolic hydroxy group and/or a thiol group are preferably used (EP0453857A).

The thermally dissociating encapsulated toner suitably used in the present invention can be produced by any known methods such as interfacial polymerization, etc., and this encapsulated toner is composed of a heat-fusible core material containing at least a coloring agent and a shell formed thereon so as to cover the surface of the core material, wherein the main components of the shell are a resin prepared by reacting:

(A) an isocyanate and/or isothiocyanate compound comprising:

(1) 0 to 30 mol % of a monovalent isocyanate and/or isothiocyanate compounds, and (2) 100 to 70 mol % of at least a divalent isocyanate and/or isothiocyanate compounds with (B) an active hydrogen compound comprising:

(3) 0 to 30 mol % of a compound having one active hydrogen atom reactive with the isocyanate and/or isothiocyanate groups and (4) 100 to 70 mol % of a compound having at least two active hydrogen atoms reactive with the isocyanate and/or isothiocyanate groups at a molar ratio of the component (A) to the component (B) of between 1:1 and 1:20, and wherein at least 30% of all of the linkages formed from the isocyanate or isothiocyanate groups are thermally dissociating linkages.

According to the present invention, the thermally dissociating linkage is preferably one formed by the reaction between a phenolic hydroxyl and/or thiol group and an isocyanate and/or isothiocyanate group.

Examples of the monovalent isocyanate compounds to be used as the the component (1) in the present invention include ethyl isocyanate, octyl isocyanate, 2-chloroethyl isocyanate, chlorosulfonyl isocyanate, cyclohexyl isocyanate, n-dodecyl isocyanate, butyl isocyanate, n-hexyl isocyanate, lauryl isocyanate, phenyl isocyanate, m-chlorophenyl isocyanate, 4-chlorophenyl isocyanate, p-cyanophenyl isocyanate, 3,4-dichlorophenyl isocyanate, o-tolyl isocyanate, m-tolyl isocyanate, p-tolyl isocyanate, p-toluenesulfonyl isocyanate, 1-naphthyl isocyanate, o-nitrophenyl isocyanate, m-nitrophenyl isocyanate, p-nitrophenyl isocyanate, p-bromophenyl isocyanate, o-methoxyphenyl isocyanate, m-methoxyphenyl isocyanate, p-methoxyphenyl isocyanate, ethyl isocyanatoacetate, butyl isocyanatoacetate and trichloroacetyl isocyanate.

Examples of the divalent or higher isocyanate compounds to be used as the component (2) in the present invention include aromatic isocyanate compounds such as 2,4-tolylene diisocyanate, 2,4-tolylene diisocyanate dimer, 2,6-tolylene diisocyanate, p-xylylene diisocyanate, m-xylylene diisocyanate, 4,4'-diphenylmethane diisocyanate, 1,5-naphthylene diisocyanate, 3,3'-dimethyldiphenyl-4,4'-diisocyanate, 3,3'-dimethyldiphenylmethane-4,4'-diisocyanate, m-phenylene diisocyanate, triphenylmethane triisocyanate and polymethylenephenyl isocyanate; aliphatic isocyanate compounds such as hexamethylene diisocyanate, trimethylhexamethylene diisocyanate, lysine diisocyanate and dimer acid diisocyanates; alicyclic isocyanate compounds such as isophorone diisocyanate, 4,4'-methylenebis (cyclohexyl isocyanate), methylcyclohexane-2,4(or 2,6) diisocyanate and 1,3-(isocyanatomethyl)cyclohexane; and other isocyanate compounds such as an adduct of 1 mol of trimethylolpropane with 3 mol of tolylene diisocyanate.

Examples of the isothiocyanate compounds include phenyl isothiocyanate, xylylene-1,4-diisothiocyanate and ethylidene diisothiocyanate.

Among these isocyanate and isothiocyanate compounds, compounds having an isocyanate group directly bonded to an aromatic ring are preferred, because they are effective in forming a urethane resin having a low thermal dissociation temperature. According to the present invention, the monovalent isocyanate and/or isothiocyanate compound (1) also serves as a molecular weight modifier for the shell-forming resin and can be used in an amount of at most 30 mol % based on the isocyanate component and/or the isothiocyanate component. When the amount exceeds 30 mol %, the storage stability of the obtained encapsulated toner is undesirably poor.

Examples of compounds having one active hydrogen atom reactive with isocyanate and/or isothiocyanate groups to be used as component (3) in the present invention include aliphatic alcohols such as methyl alcohol, ethyl alcohol, propyl alcohol, isopropyl alcohol, butyl alcohol, isobutyl alcohol, tert-butyl alcohol, pentyl alcohol, hexyl alcohol, cyclohexyl alcohol, heptyl alcohol, octyl alcohol, nonyl alcohol, decyl alcohol, lauryl alcohol and stearyl alcohol; aromatic alcohols such as phenol, o-cresol, m-cresol, p-cresol, 4-butylphenol, 2-sec-butylphenol, 2-tert-butylphenol, 3-tert-butylphenol, 4-tert-butylphenol, nonylphenol, isononylphenol, 2-propenylphenol, 3-propenylphenol, 4-propenylphenol, 2-methoxyphenol, 3-methoxyphenol, 4-methoxyphenol, 3-acetylphenol, 3-carbomethoxyphenol, 2-chlorophenol, 3-chlorophenol, 4-chlorophenol, 2-bromophenol, 3-bromophenol, 4-bromophenol, benzyl alcohol, 1-naphthol, 2-naphthol and 2-acetyl-1-naphthol; and amides such as ε-caprolactam.

Particularly, a phenol derivative represented by the following formula (I) is preferably used:

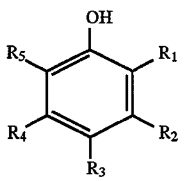

(I)

wherein $R_1$, $R_2$, $R_3$, $R_4$ and $R_5$ each independently represents a hydrogen atom, an alkyl group having 1 to 9 carbon atoms, an alkenyl, alkoxy, alkanoyl, carboalkoxy or aryl group or a halogen atom.

Examples of the dihydric or higher alcohols among the compounds having at least two active hydrogen atoms reactive with isocyanate and/or isothiocyanate groups to be used as the component (4) in the present invention include catechol, resorcinol, hydroquinone, 4-methylcatechol, 4-tert-butylcatechol, 4-acetylcatechol, 3-methoxycatechol, 4-phenylcatechol, 4-methylresorcinol, 4-ethylresorcinol, 4-tert-butylresorcinol, 4-hexylresorcinol, 4-chlororesorcinol, 4-benzylresorcinol, 4-acetylresorcinol, 4-carbomethoxyresorcinol, 2-methylresorcinol, 5-methylresorcinol, tert-butylhydroquinone, 2,5-di-tert-butylhydroquinone, 2,5-di-tert-amylhydroquinone, tetramethylhydroquinone, tetrachlorohydroquinone, methylcarboaminohydroquinone, methylureidohydroquinone, benzonorbornene-3,6-diol, bisphenol A, bisphenol S, 3,3'-dichlorobisphenol S, 2,2'-dihydroxybenzophenone, 2,4-dihydroxybenzophenone, 3,3'-dihydroxybenzophenone, 2,2'-dihydroxydiphenyl, 4,4'-dihydroxydiphenyl, 2,2'-dihydroxydiphenylmethane, 3,4-bis(p-hydroxyphenyl)hexane, 1,4-bis(2-(p-hydroxyphenyl) propyl)benzene, bis(4-hydroxyphenyl)methylamine, 1,3-dihydroxynaphthalene, 1,4-dihydroxynaphthalene, 1,5-dihydroxynaphthalene, 2,6-dihydroxynaphthalene, 1,5-dihydroxyanthraquinone, 2-hydroxybenzyl alcohol, 4-hydroxybenzyl alcohol, 2-hydroxy-3,5-di-tert-butylbenzyl alcohol, 4-hydroxy-3,5-di-tert-butylbenzyl alcohol, 4-hydroxyphenethyl alcohol, 2-hydroxyethyl 4-hydroxybenzoate, 2-hydroxyethyl 4-hydroxyphenylacetate, resorcinol mono-2-hydroxyethyl ether, hydroxyhydroquinone, gallic acid and ethyl 3,4,5-trihydroxybenzoate.

Among these dihydric or higher alcohols, catechol derivatives reprsented by the following formula (II) and resorcinol derivatives represented by the following formula (III) are preferably used:

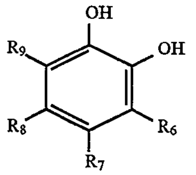
(II)

wherein $R_6$, $R_7$, $R_8$ and $R_9$ each independently represents a hydrogen atom, an alkyl group having 1 to 6 carbon atoms, an alkenyl, alkoxy, alkanoyl, carboalkoxy or aryl group or a halogen atom.

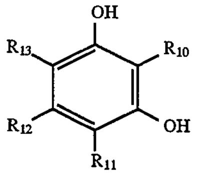
(III)

wherein $R_{10}$, $R_{11}$, $R_{12}$ and $R_{13}$ are each independently represents a hydrogen atom, an alkyl group having 1 to 6 carbon atoms, an alkenyl, alkoxy, alkanoyl, carboalkoxy or aryl group or a halogen atom.

Further, examples of the compounds having at least one isocyanate- or isothiocyanate-reactive functional group other than the hydroxyl group and at least one phenolic hydroxyl group include o-hydroxybenzoic acid, m-hydroxybenzoic acid, p-hydroxybenzoic acid, 5-bromo-2-hydroxybenzoic acid, 3-chloro-4-hydroxybenzoic acid, 4-chloro-2-hydroxybenzoic acid, 5-chloro-2-hydroxybenzoic acid, 3,5-dichloro-4-hydroxybenzoic acid, 3-methyl-2-hydroxybenzoic acid, 5-methoxy-2-hydroxybenzoic acid, 3,5-di-tert-butyl-4-hydroxybenzoic acid, 4-amino-2-hydroxybenzoic acid, 5-amino-2-hydroxybenzoic acid, 2,5-dinitrosalicylic acid, sulfosalicylic acid, 4-hydroxy-3-methoxyphenylacetic acid, catechol-4-carboxylic acid, 2,4-dihydroxybenzoic acid, 2,5-dihydroxybenzoic acid, 2,6-dihydroxybenzoic acid, 3,4-dihydroxybenzoic acid, 3,5-dihydroxybenzoic acid, 3,4-dihydroxyphenylacetic acid, m-hydroxycinnamic acid, p-hydroxycinnamic acid, 2-amino-4-methylphenol, 2-amino-5-methylphenol, 5-amino-2-methylphenol, 3-amino-2-naphthol, 8-amino-2-naphthol, 1-amino-2-naphthol-4-sulfonic acid, 2-amino-5-naphthol-4-sulfonic acid, 2-amino-4-nitrophenol, 4-amino-2-nitrophenol, 4-amino-2,6-dichlorophenol, o-aminophenol, m-aminophenol, p-aminophenol, 4-chloro-2-aminophenol, 1-amino-4-hydroxyanthraquinone, 5-chloro-2-hydroxyaniline, α-cyano-3-hydroxycinnamic acid, α-cyano-4-hydroxycinnamic acid, 1-hydroxynaphthoic acid, 2-hydroxynaphthoic acid, 3-hydroxynaphthoic acid and 4-hydroxyphthalic acid.

Further, examples of the polythiol compounds having at least one thiol group in each molecule include ethanethiol, 1-propanethiol, 2-propanethiol, thiophenol, bis(2-mercaptoethyl)ether, 1,2-ethanedithiol, 1,4-butanedithiol, bis(2-mercaptoethyl) sulfide, ethylene glycol bis(2-mercaptoacetate), ethylene glycol bis(3-mercaptopropionate), 2,2-dimethylpropanediol bis(2-mercaptoacetate), 2,2-dimethylpropanediol bis(3-mercaptopropionate), trimethylolpropane tris(2-mercaptoacetate), trimethylolpropane tris(3-mercaptopropionate), trimethylolethane tris(2-mercaptoacetate), trimethylolethane tris(3-mercaptopropionate), pentaerythritol tetrakis(2-mercaptoacetate), pentaerythritol tetrakis(3-mercaptopropionate), dipentaerythritol hexakis(2-mercaptoacetate), dipentaerythritol hexakis(3-mercaptopropionate), 1,2-dimercaptobenzene, 4-methyl-1,2-dimercaptobenzene, 3,6-dichloro-1,2-dimercaptobenzene, 3,4,5,6-tetrachloro-1,2-dimercaptobenzene, xylylenedithiol and 1,3,5-tris(3-mercaptopropyl) isocyanurate.

In the thermally dissociating shell-forming resin used in the present invention, at least 30%, perferably at least 50% of all of the linkages formed from isocyanate or isothiocyanate groups are thermally dissociating linkages. When the content of the thermally dissociating linkages is less than 30%, the strength of the shell in the heat-and-pressure fixing cannot be sufficiently lowered, making it less likely to exhibit any advantageous fixing performance of the core material.

In the thermally dissociating encapsulated toner of the present invention, other compounds having an isocyanate-reactive functional group other than phenolic hydroxyl and thiol groups, which may be used as a shell-forming material in such an amount as not to lower the ratio of the linkages formed by the reaction of isocyanate and/or isothiocyanate groups with phenolic hydroxyl and/or thiol groups to the all of the linkages formed from isocyanate and/or isothiocyanate groups is less than 30%, include, for example, the following active methylene compounds such as malonate and acetoacetate, oxime such as methyl ethyl ketone oxime, carboxylic acid, polyol, polyamine, aminocarboxylic acid and aminoalcohol.

According to the present invention, the compound having one active hydrogen atom reactive with isocyanate and/or isothiocyanate groups as the component (3) may be used in an amount of at most 30 mol % based on the active hydrogen component. When the amount exceeds 30 mol %, the storage stability of the resulting toner is undesirably poor.

Further, the molar ratio of (A) the isocyanate compound and/or isothiocyanate compound comprising the components (1) and (2) to (3) the active hydrogen compounds comprising the components (3) and (4) preferably lies between 1:1 and 1:20 in order to obtain a resin free from unreacted isocyanate groups.

In the production of the encapsulated toner according to the present invention, the shell is preferably formed by an interfacial polymerization or an in-situ polymerization. Alternatively, it may be formed by a dry method comprising stirring in an air stream at a high rate matrix particles used as a core material together with particles used as a shell-forming material having a number-average particle size of one-eighth or less of that of the matrix particles.

The resins to be used as core materials of the encapsulated toner according to the present invention are thermoplastic resins having glass transition points (Tg) of 10° to 50° C., and examples thereof include polyester resins, polyester-polyamide resins, polyamide resins and vinyl resins, among which vinyl resins are particularly preferable. When the glass transition point (Tg) is less than 10° C., the storage stability of the resulting encapsulated toner is undesirably poor, and when it exceeds 50° C., the fixing strength of the encapsulated toner is undesirably poor.

Examples of the monomers constituting the vinyl resins include styrene and its derivatives such as styrene, o-methylstyrene, m-methylstyrene, p-methylstyrene, α-methylstyrene, p-ethylstyrene, 2,4-dimethylstyrene, p-chlorostyrene and vinylnaphthalene; ethylenically unsaturated monoolefins such as ethylene, propylene, butylene and isobutylene; vinyl esters such as vinyl chloride, vinyl bromide, vinyl fluoride, vinyl acetate, vinyl propionate, vinyl formate and vinyl caproate; ethylchic monocarboxylic acids and esters thereof such as acrylic acid, methyl acrylate, ethyl acrylate, n-propyl acrylate, isopropyl acrylate, n-butyl acrylate, isobutyl acrylate, tert-butyl acrylate, amyl acrylate, cyclohexyl acrylate, n-octyl acrylate, isooctyl acrylate, decyl acrylate, lauryl acrylate, 2-ethylhexyl acrylate, stearyl acrylate, methoxyethyl acrylate, 2-hydroxyethyl acrylate, glycidyl acrylate, 2-chloroethyl acrylate, phenyl acrylate, methyl α-chloroacrylate, methacrylic acid, methyl methacrylate, ethyl methacrylate, n-propyl methacrylate, isopropyl methacrylate, n-butyl methacrylate, isobutyl methacrylate, tert-butyl methacrylate, amyl methacrylate, cyclohexyl methacrylate, n-octyl methacrylate, isooctyl methacrylate, decyl methacrylate, lauryl methacrylate, 2-ethylhexyl methacrylate, stearyl methacrylate, methoxyethyl methacrylate, 2-hydroxyethyl methacrylate, glycidyl methacrylate, phenyl methacrylate, dimethylaminoethyl methacrylate and diethylaminoethyl methacrylate; ethylenic monocarboxylic acid derivatives such as acrylonitrile, methacrylonitrile and acrylamide; ethylenic dicarboxylic acids and derivatives thereof such as dimethyl maleate; vinyl ketones such as vinyl methyl ketone; vinyl ethers such as vinyl methyl ether; vinylidene halides such as vinylidene chloride; and N-vinyl compounds such as N-vinylpyrrole and N-vinylpyrrolidone.

Among the above core material resin-constituting monomers according to the present invention, the core material-forming resin contains, in the main skeleton of the resin, styrene or its derivatives preferably in an amount of 50 to 90 parts by weight, and the ethylenic monocarboxylic acid or an ester thereof preferably in an amount of 10 to 50 parts by weight to control the thermal properties of the resin, such as the softening point.

When the monomer composition constituting the core material-forming resin according to the present invention contains a crosslinking agent, which may be also used, if necessary, as a mixture of two or more of them, any known crosslinking agents may be properly used. When the amount of the crosslinking agent added is too large, the resulting toner is less likely to be heat-fused, thereby resulting in poor heat fixing ability and heat-and-pressure fixing ability. On the contrary, when the amount is too small, in heat-and-pressure fixing, a part of the toner cannot be completely fixed on a paper but rather adheres to the surface of a roller, which in turn is transferred to a subsequent paper which creates the so-called "offset" or "offset phenomenon." Accordingly, the amount of the crosslinking agent is preferably 0.001 to 15% by weight, more preferably 0.1 to 10% by weight, based on the monomers used.

The core material of the thermally dissociating encapsulated toner according to the present invention may further contain, if necessary, one or more offset inhibitors of any known kind for the purpose of improving offset resistance at heat-and-pressure fixing. These offset inhibitors are contained in an amount of 1 to 20% by weight based on the resin contained in the core material.

The core material of the thermally dissociating encapsulated toner according to the present invention contains a coloring agent, which may be any one of the dyes and pigments used in the conventional toners. The coloring agent is generally contained in an amount of 1 to 15 parts by weight per 100 parts by weight of the resin contained in the core material.

In addition, in the shell-forming materials of the thermally dissociating encapsulated toner according to the present invention and in the core material, a metal-containing dye which has been used for toners, for example, a metal complex of an organic compound having a carboxyl or nitrogenous group, such as nigrosine, may be added in an effective amount as a charge control agent. Alternatively, such a charge control agent may be mixed with the toner.

The thermally dissociating encapsulated toner according to the present invention may contain, if necessary, a fluidity improver and/or a cleanability improver. Further, for the purpose of controlling the developability of the encapsulated toner, an additive, for example, finely powdered polymethyl methacrylate, etc. may be added. Furthermore, for the purposes of toning or resistance control, a small amount of carbon black may be used.

The thermally dissociating encapsulated toner of the present invention preferably has a softening point of 80° to 150° C. If the softening point is lower than 80° C., the offset resistance of the resulting encapsulated toner is undesirably poor, and when it exceeds 150° C., the fixing strength of the encapsulated toner is undesirably poor.

Although the particle size of the encapsulated toner according to the present invention is not particularly limited, the average particle size thereof is generally 3 to 30 μm. The preferred thickness of the shell of the encapsulated toner is from 0.01 to 1 μm. When the thickness is less than 0.01 μm , the blocking resistance of the resulting encapsulated toner is poor, and when it exceeds 1 μm, the heat fusibility of the resulting encapsulated toner is undesirably poor.

Examples of the thermally dissociating encapsulated toners which is preferably used in the present invention will be described below, but the present invention is not confined to these alone.

The method of forming fixed images of the present invention are detailed below, referring to the drawings. FIG. 1 is a schematic view of an apparatus used for the method of forming fixed images of the present invention. Element 1 is a photoconductor such as of amorphous silicon or organic photoconductor, etc. in which a photoconductive layer is provided on a conductive supporter. For photoconductors, those practically used are photoconductors of selenium, silicon, organic groups, etc., and any of these can be used. Element 7 is a charger located opposite to the photoconductor 1. The charging means is not particularly restricted, and any of, for example, a corona charger, a brush charger, a roller charger, etc. can be used. Element 2 is an exposure device located opposite to the photoconductor 1 for forming electrostatic latent images on the photoconductor surface. For an exposure device 2, light sources such as laser beams, LED or EL arrays, etc. are used in combination with an image-forming optical system. Alternatively, a device based on optical systems projecting a reflected light of a document usually provided in the copying machine can be used. Element 3 is a developer device located opposite to the photoconductor 1 for making visible the electrostatic latent image formed on the photoconductor with the toner. For a developer device, any of the commonly used two-component magnetic brush developer devices, the one-component magnetic brush developer device, and the one-component non-magnetic developer device, etc. can be used. The toners to be used in the present invention are thermally dissociating encapsulated toners, which are produced by an interfacial polymerization method, etc.

The toner applied to the electrostatic latent image formed on the photoconductor is transferred by the transfer device 5 to the recording medium 6. Known as transfer methods are a corona transfer method, wherein corona ions are supplied to the reverse side of the recording medium; a roller transfer method, wherein a transfer electric field is formed by voltage generated by pressing a conductive roller, to which a voltage is applied, against the reverse side of the recording medium; and an induction belt transfer method, wherein an inductive belt serves to convey the recording medium, etc., and all of these methods are applicable to the present invention.

Figure 7:
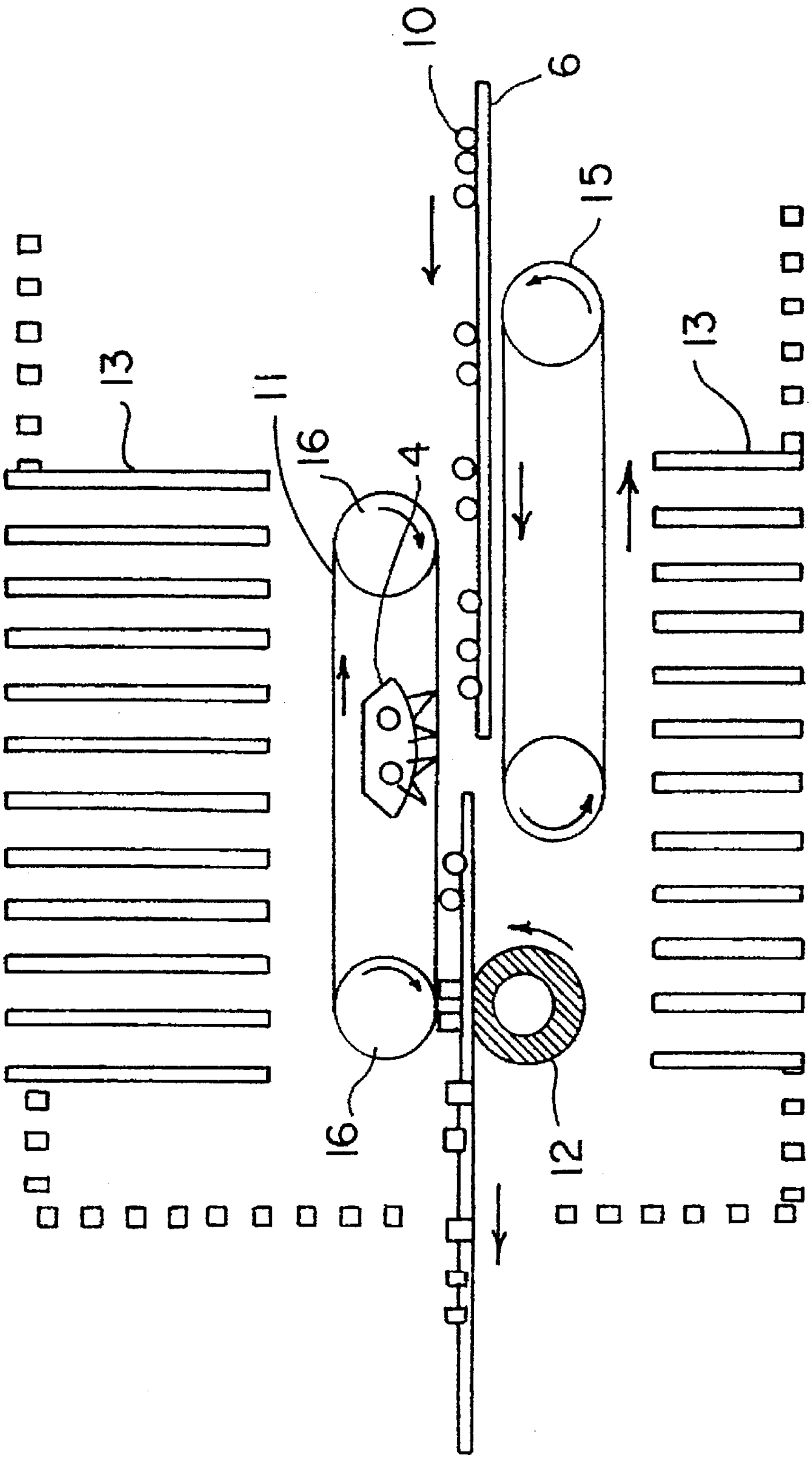
FIG. 7 is a schematic view of the fixing process in the method as defined by the present invention, in which a heater through an endless film is used as a heat source.
Figure 8:
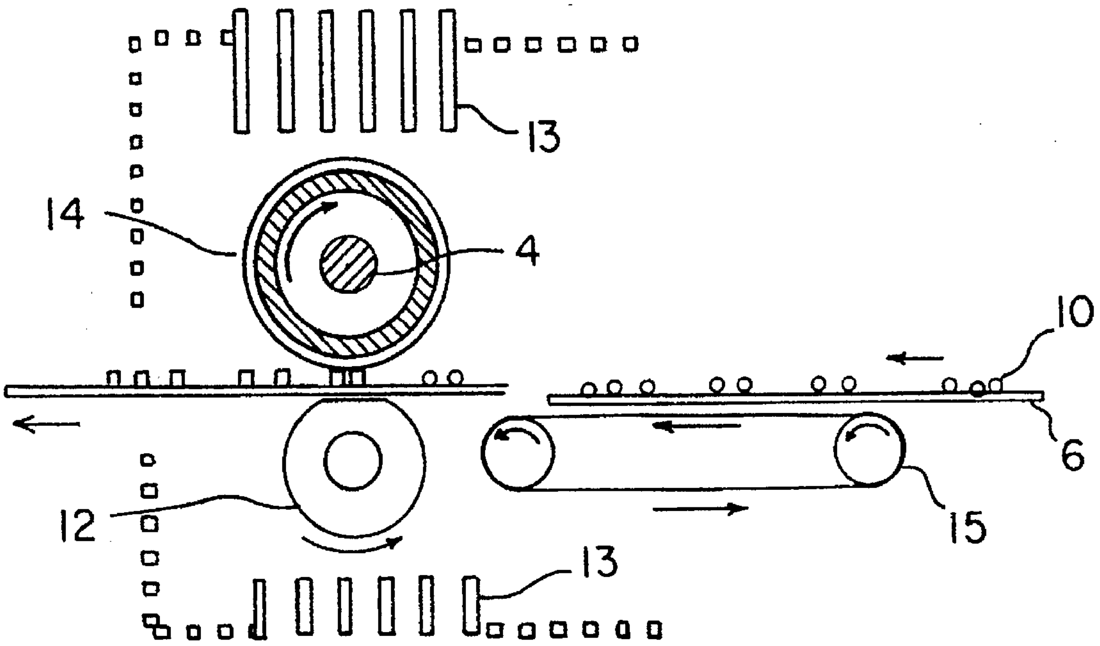
FIG. 8 is a schematic view of the fixing process in the method as defined by the present invention, in which a heat roller is used as a heat source.

The cleaner device 8 such as a cleaning web for removing trace amounts of the toner remaining on the photoconductor after the transfer process is placed opposite to the photoconductor 1. As shown in FIG. 1 and FIG. 7, the fixing device is provided with a heater 2, a fixing roller 12, holding rollers 16 and an endless film 11. Alternatively, as shown in FIG. 8, a heat roller 14 in which a heater 4 is incorporated is provided along with a fixing roller 12.

As shown in FIG. 1 and FIG. 7, when the endless film is used, the heater 4 is arranged above and near the conveying route of the recording medium, so that it can pre-heat the surface of the toner transferred onto the recording medium through the endless film in order to fix the toner. As long as the film surface can be heated up to 120° C., any type of heat source can be used for the heater 4. Further, the endless film can be of a type which generates heat when electricity is conducted therethrough, in which case, the heater 4 is no longer required. For a heating body of the heater 4, a hot plate, a quartz heater, a flash heater, a heating belt, a heating element, etc. can be used.

Since the heating temperature can be set at a low level, the endless film is not confined to heat-resistant films such as fluoro-resins, polyimide resins, polyamide resins, polyester resins, and includes non-heat resistant films such as polypropylene films, polyethylene films, cellophane, etc. The endless film is stretched with at least two holding rollers 16.

The fixing roller 12 is a means for fixing the transferred toner image by pressing the recording medium having the transferred toner image against the endless film surface and is used as a pressure roller. As fixing takes place in the case of ordinary fixing devices at a high temperature (around 200° C.), a heat-resistant silicone rubber, etc. must be used for the fixing roller. However, since the fixing roller in contact with the reverse side of the recording medium is not directly heated, and the temperature of the toner surface which is pre-heated by the heater 4 rises at most to only 120° C. , the temperature transmitted to the fixing roller is very low. Therefore, a high heat resistance is not required for the fixing roller. Accordingly, as long as it is an elastic body having a softening point of not less than 120° C., there are no limitations on its material, and any of the ordinary inexpensive elastic materials can be used. Further, since such a low nip pressure of 4 kg/cm is applicable to a fixing device in the present invention, the durability of the fixing roller becomes longer.

As shown in FIG. 8, when a heat roller is used for fixing, since the fixing takes place at a high temperature (around 200° C.) in the case of a conventional device, heat-resistant films such as of fluoro-resins, polyimide resins, polyamide resins, polyamide-imide resins, etc. are used. In the present invention, since the fixing temperature is not more than 120° C., the use of the conventional heat-resistant films makes the durability of the heat roller longer. In addition, non-heat-resistant films as those of polyester resins, polypropylene resins, polyethylene resins, etc. and cellophane can be used. The fixing roller 12 which is used together with the heat roller serves as a pressure roller as in the case of using the endless film, and as long as it is an elastic body having a softening point not less than 120° C., there are no limitations on its material, and any ordinary inexpensive elastic material can be used. Further, since its nip pressure is less than 4 kg/cm in the present invention, the durability of the fixing roller becomes longer.

The recording paper 6 used as a recording medium is, for instance, as shown in FIG. 7, is transported to the fixing device by the conveyor belt 15 along the surface of the endless film 11, while being pre-heated by the heater 4 through the endless film onto which a toner image has been transferred. The reording paper 6 is then pressed between the fixing roller 12 and the endless film 11 to fix the toner image and discharged out of the system by a paper discharging means not illustrated in the figure. In this connection, the conveying speed as well as the heating temperature of the heater is so regulated that the pre-heating temperature of the toner is maintained within the predetermined temperature range. Alternatively, as shown in FIG. 8, the toner image on the recording medium transported by the conveyor belt 15 is fixed by pressing and heating between the heat roller 14 and the fixing roller 12, and the recording medium is then discharged.

Element 13 is a radiator, and instead of a forced radiating apparatus such an electric fan as used conventionally, a honeycomb-type apparatus can be used in the present invention. The apparatus has a cross-section in any form including a square, a rectangie, a paralellogram, a regular hexagon, etc. The radiator 13 serves to radiate the heat generated in the fixing section, and is so arranged that the air stream may flow vertically from below to above and facilitate radiation. Its material can be of metal plates such as aluminium plates, stainless steel plates, etc. or plastic plates such as acrylic resin plates, bakelite plates, etc. Since the fixing temperature is low in the present invention,.a sufficient radiation is facilitated if the honeycomb-type radiator as mentioned above is provided.

The photoconductor 1, the endless film 11, the holding roller 16, the heat roller 14 and the fixing roller 12 are rotated by specified driving means not illustrated in the figures in the direction shown in the respective drawings at fixed peripheral speeds.

Next, the individual processes of the method of forming fixed images by the present invention having the above-mentioned construction will be described.

Figure 3:
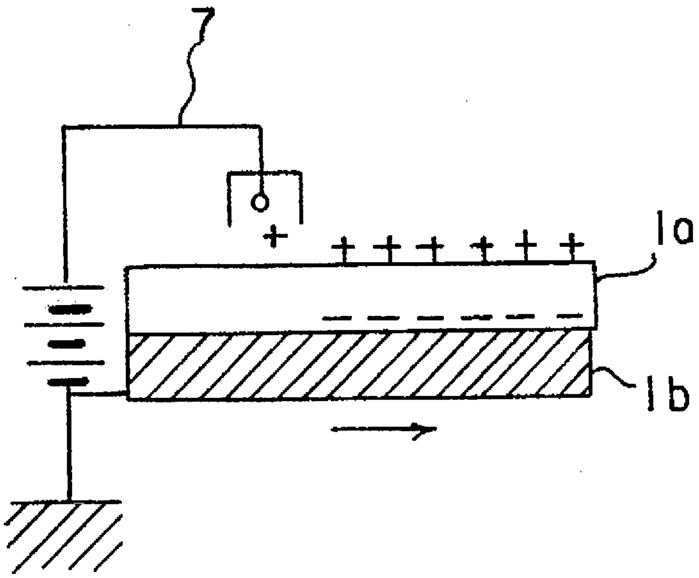
FIG. 3 is a schematic view showing the charging process in the method as defined by the present invention.
Figure 4:
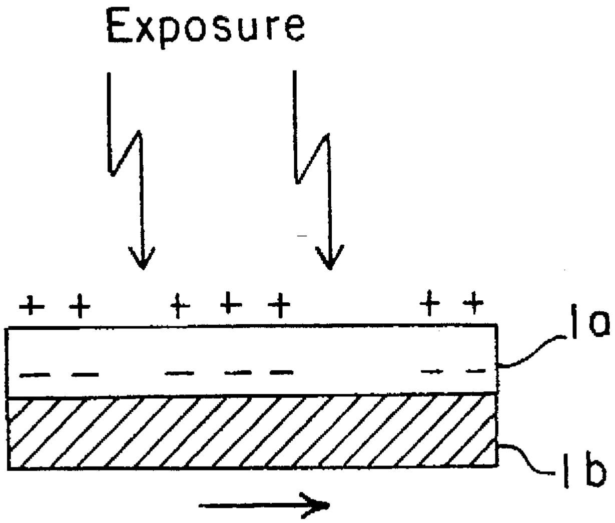
FIG. 4 is a schematic view showing the exposing process in the method as defined by the present invention.
Figure 5:
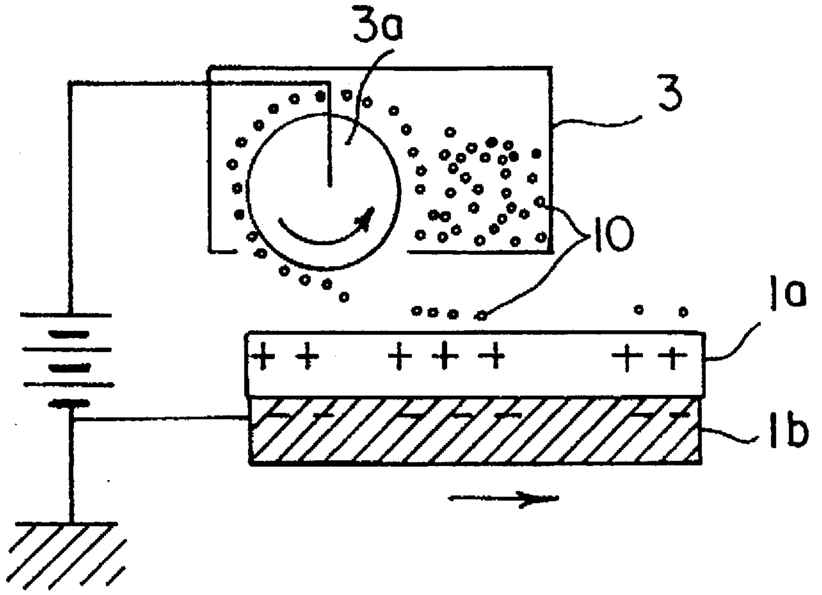
FIG. 5 is a schematic view showing the developing process in the method as defined by the present invention.
Figure 6:
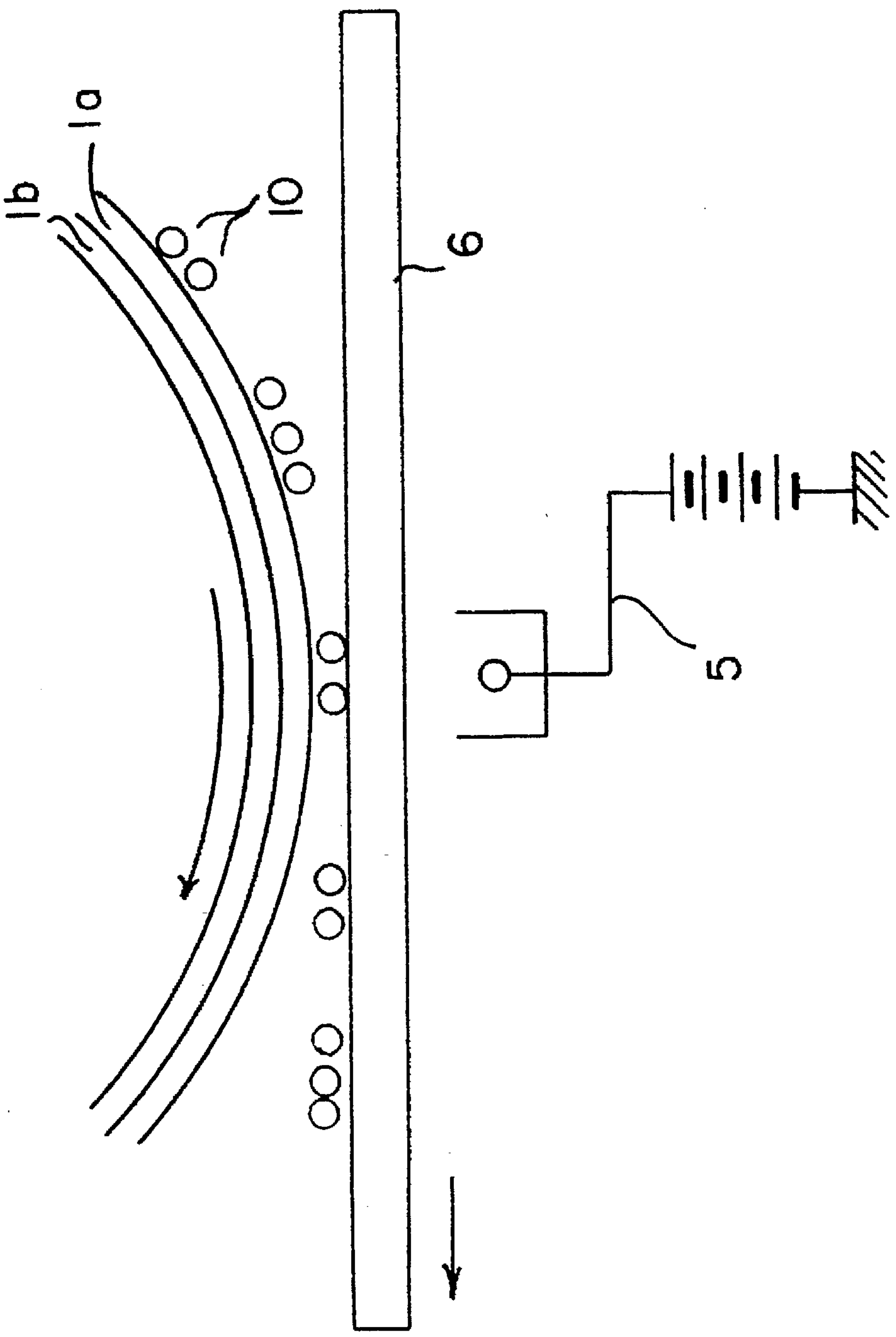
FIG. 6 is a schematic view showing the transfer process in the method as defined by the present invention.

FIG. 3 shows a charging process, FIG. 4 an exposing process, FIG. 5 a developing process, FIG. 6 a transfer process and FIGS. 7 & 8 fixing processes.

In the charging process, as shown in FIG. 3, a specified charge is uniformly supplied, e.g. by the corona charger 7 to the photoconductor surface. A photoconductor sensitive to a positive charge is taken here for an example, and the surface of the conductive supporter 1*b* is coated with the photoconductive layer 1*a* to form the photoconductor 1. A uniform charge is applied by the corona charger 7 to the photoconductive layer 1*a*, thereby positively charging the surface of the photoconductive layer 1*a*.

Figure 2:
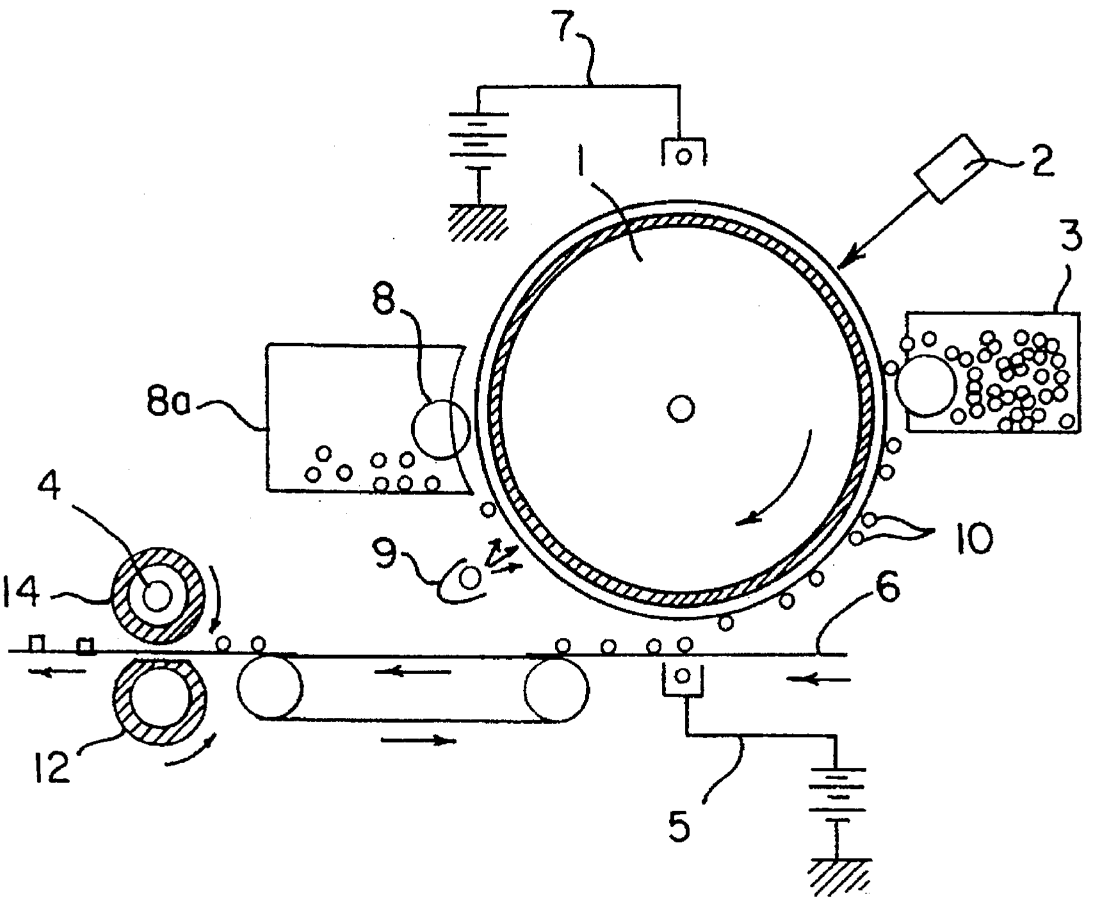
FIG. 2 is a schematic view of an apparatus used for conventional methods of forming fixed images.

In the exposing process, as shown in FIG. 2, a light from the exposure device 2 is irradiated to the surface of the related photoconductor, so that a leakage of charges occurs only in the exposed parts to form an electrostatic latent image on the photoconductive layer 1*a*.

In the developing process, as shown in FIG. 5, the toner triboelectrically charged inside the developer device is transported by the rotating sleeve 3*a*, and developed onto the photoconductor surface in proportion to the charge on the photoconductor surface. The developing process is an assortment of normal development in which a reversely polarized toner adheres to the charges by the Coulomb's force and of reverse development in which the toner adheres to the charges lost due to exposure to the light. The development process in the present invention applies to either method, but the case of the normal development is illustrated in FIG. 5.

In the transfer process, as shown in FIG. 6, the toner image on the photoconductor body surface accepts the charges from the reverse side of the recording medium 6 such as the recording paper through a transfer-corotron or a transfer-roller, and it is then transferred to the recording medium 6. Part of the toner is left behind untransferred on the photoconductor surface, which is removed by the cleaning device 8 such as a cleaning web, which is arranged opposite to the photoconductor as shown in FIG. 1.

In the fixing process, when an endless film is used as shown in FIG. 7, the toner image transferred on the surface of the recording medium 6 is pre-heated without any contact by the heater 4 through a transparent endless film, pressed in passing between the fixing roller 12 and the endless film 11 and fixed onto the recording medium 6 more firmly. Alternatively, when a heat roller is used as shown in FIG. 8, the toner image is fixed on the recording medium 6 by heating and pressing while passing between the heat roller 14 and the fixing roller 12.

In either case where an endless film is used or where a heat roller is used, in order to fix the toner transferred on the recording medium such as a recording paper, it is heated within the temperature range of normally between 40° C. and 120° C., preferably between 60° and 120° C. in the present invention. When the heating temperature is less than 40° C., the melting of the toner becomes insufficient, and when it exceeds 120° C., the fixing temperature becomes too high, posing problems incurred by the conventional methods as mentioned above.

In the case of the conventional methods, the nip pressure in the fixing process has to be made higher, if the fixing temperature is made lower, thereby requiring a nip pressure of not less than 4 kg/cm. However, in the present invention, although the fixing temperature is set to be no more than 120° C., a sufficient fixing strength can be obtained with a nip pressure of less than 4 kg/cm, and even less than 2 kg/cm in many cases, or more exactly preferably within the range of 0.5 kg/cm to 2 kg/cm. Moreover, in general, if the temperature applied to the surface of the recording medium is too high, the recording paper tends to curl. If the temperature is too low, the fixing of the toner becomes insufficient, making record preservation difficult. Therefore, since the fixing can be carried out in the temperature range of 40° C. to 120° C. in the present invention as mentioned above, such problems are not likely to take place.

On the other hand, the charges remaining on the photoconductor 1 after the developing process and the transfer process are over are neutralized by a charge eraser 9 such as a charge erasing lamp into a reusable state again for the charging process.

In addition, the present invention is not confined to the above-mentioned embodiments, and specifications of the kinds of individual apparatus, processes etc. can be revised based on the principles of the present invention.

By using the method of forming fixed images of the present invention, the following effects can be obtained:

(1) Since the fixing is carried out at a fixing temperature of not more than 120° C., the fixing apparatus can be simplified and made smaller and less expensive.

(2) Since the fixing is carried out at a fixing temperature of not more than 120° C., heat-resistant members which are no longer necessary for the fixing device and the periphery thereof can be replaced with less expensive materials, thereby lowering the cost of the printing device.

(3) Since the fixing is carried out at a fixing temperature of not more than 120° C. with a low nip pressure, paper sheets become less likely to curl or jam, thus conserving its maintenance.

(4) Since the fixing is carried out at a fixing temperature of not more than 120° C. with a lower nip pressure, durability of the components of the fixing device and the periphery thereof becomes longer, thus conserving its maintenance.

(5) Since a toner for the low-temperature fixing is used, the temperature of the heating body in the fixing device can be set low with only a small rise in the temperature. Accordingly, either a smaller-sized forced radiation device such as an electric fan or a honeycomb-type cooling apparatus as proposed in the present invention can be used for radiating generated heat, thus eliminating the noise problem.

(6) Since the waiting time for the temperature rise in the fixing device is shortened, quick printing is made possible.

EXAMPLES

The present invention is hereinafter described in more detail by means of the following working examples, but the present invention is not limited by them.

Production Example of Encapsulated Toner

To a mixture comprising 70.0 parts by weight of styrene, 30.0 parts by weight of 2-ethylhexyl acrylate and 1.0 part by weight of divinylbenzene, 10.0 parts by weight of carbon black "#44" (manufactured by Mitsubishi Chemical Industries, Ltd.), 4.0 parts by weight of 2,2'-azobisisobutyronitrile, 9.5 parts by weight of 2,4'-diphenylmethane diisocyanate "Millionate MT" (manufactured by Nippon Polyurethane Industry Co., Ltd.) are added. The obtained mixture is introduced into an attritor (manufactured by Mitsui Miike Kakoki) and dispersed at for 5 hours to give a polymerizable composition. This composition is added to 800 g of a 2% by weight aqueous colloidal solution of tricalcium phosphate which had been preliminarily prepared in a 2-liter separable glass flask, so as to give a concentration of 30% by weight. The obtained mixture is emulsified and dispersed with a TK homomixer (manufactured by Tokushu Kika Kogyo) at 5° C. and a rotational speed of 10000 rpm for 2 minutes. A four-necked glass cap is set on the flask, and a reflux condenser, a thermometer, a dropping funnel fitted with a nitrogen inlet tube and a stainless steel stirring rod are set thereon. The resulting flask is placed on an electric mantle heater. A solution of 22.0 g of resorcinol, 3.6 g of diethyl malonate and 0.5 g of 1,4-diazabicyclo[2.2.2] octane in 20 g of ion-exchanged water is prepared, and the resulting mixture is dropped into the flask in a period of 30 minutes through the dropping funnel while stirring. Thereafter, the contents are heated to 80° C. and reacted for 10 hours in a nitrogen atmosphere while stirring. After cooling the reaction mixture, it is dissolved into 10%-aqueous hydrochloric acid. The resulting mixture is filtered and the obtained solid is washed with water, dried under a reduced pressure of 20 mmHg at 45° C. for 12 hours and classified with an air classifier to give the encapsulated toner with an average particle size of 9 μm having a shell made of a resin having a thermally dissociating urethane linkage. The glass transition point assignable to the resin contained in the core material is 30.2° C., and its softening point is 130.0° C.

Production Example of Reference Toner

To 100 parts by weight of a polyester resin (Bisphenol-type polyester resin; softening point: 135° C.; Tg: 65° C.), 7 parts by weight of carbon black (manufactured by Mitsubishi Kasei Ltd., MA8), 3 parts by weight of a polypropylene wax (Sanyo Kasei Ltd., Biscol 660P), and 2 parts by weight of a charge control agent (Hodogaya Kagaku Ltd., Aizenspilon Black TRH) are mixed, and the resulting mixture is kneaded by a pressurized kneader. After cooling the obtained mixture, it is pulverized with a pulverizing mill and then classified with a classifier to obtain a toner having a particle distribution range of 5 to 25 μm and an average particle size of 10 μm. To 1 kg of the toner, 5 g of colloidal silica (Nihon Aerozil Ltd.: R972) is externally added to obtain a surface-treated reference toner.

TEST EXAMPLE 1

50 g of the toner obtained in Production Example of Encapsulated Toner is blended together with 1 kg of a commercially available ferrite carrier by using a V-type blender to obtain a developer 1. The obtained developer 1 is loaded on a commercially available copying machine to develop images without heat-fixing. The fixing ability and the non-offsetting region of the toner of the present invention are measured using the fixing device of the present invention shown in FIG. 7 (endless film made of polyethylene terephtalate; fixing roller diameter: 20 mmϕ; nip pressure: 1.0 kg/cm; a heater manufactured by Ushio Electric Ltd.), while varying the heating temperature at a linear velocity of 20 mm/sec. As a result, the toner in the present invention is sufficiently fixed to the paper-side at a surface temperature of the endless film of 110° C., and it does not show any offsetting to the endless film at a temperature between 80° C. and 160° C.

On the other hand, the toner obtained by the Production Example of Reference Toner is mixed with a commercially available ferrite carrier to prepare a developer 2. After developing images in the same manner as above using a commercially available copying machine, the fixing ability and the non-offsetting region of the reference toner are measured using the fixing device of the present invention. As a result, the reference toner is fixed to the paper-side at a surface temperature of the endless film of 130° C., and the reference toner does not show any offsetting at a temperature between 100° C. and 160° C.

TEST EXAMPLE 2

The developer 1 obtained in Test Example 1 is loaded on a commercially available copying machine to develop images without heat-fixing. The fixing ability and the non-offsetting region of the toner of the present invention are measured using the heat roller-type fixing device shown in FIG. 8 (fixing roller diameter: 20 mmϕ; nip pressure: 1.0 kg/cm; an aluminum surface of the heat roller being surface-coated with Teflon in a thickness of 20 μm; the heat-fixing roller (pressure roller) being heat-resistant silicone rubber roll), while varying the heating temperature at a linear velocity of 20 mm/sec. As a result, the toner in the present invention is sufficiently fixed to the paperside at a surface temperature of the endless film of 95° C., and the toner does not show any offsetting to the endless film at a temperature between 70° C. and 240° C.

On the other hand, by using the developer 2 carried out in the Test Example 1, developing images are obtained in the same manner as above using a commercially available copying machine. After that, the fixing ability and the non-offsetting region of the reference toner are measured using the same fixing device as above. As a result, the reference toner is fixed to the paper-side at a surface temperature of the endless film of 130° C., and the reference toner does not show any offsetting at a temperature between 110° C. and 200° C.

From these test examples, it is confirmed that by utilizing the method of forming fixed images according to the present invention using a thermally dissociating encapsulated toner, the lowest fixing temperature can be remarkably lowered, thereby resulting in no curling or jamming of the paper sheets feeded to the copying machine.

The present invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. An apparatus for fixing a shell encapsulated toner on a recording medium in an imagewise configuration, comprising, in combination:

(a) a system of providing a shell encapsulated toner image on a surface of a recording medium thereby producing a toner image-bearing surface;

(b) a recording medium conveying zone, defining a conveying route through which said recording medium supporting said toner image passes;

(c) an endless film disposed around a pair of holding rollers juxtapositioned to said recording medium conveying zone;

(d) a heater disposed adjacent said endless film wherein at least a part of said endless film is positioned between said heater and said recording medium conveying zone, said heater preheating said shell encapsulated toner image through said endless film as said recording medium supporting said toner image passes through said recording medium conveying zone, said toner image-bearing surface of said recording medium facing said endless film; and (e) a fixing roller located downstream to where said toner image passes said heater for fixing said preheated toner image with pressure to said recording medium, said fixing roller contacting a backside of said recording medium opposite said toner images-bearing surface.

2. An image-fixing apparatus according to claim 1, further including a honeycomb-type cooling radiator juxtapositioned to said recording medium conveying zone.

* * * * *